United States Patent
Hou et al.

(10) Patent No.: US 10,039,023 B2
(45) Date of Patent: Jul. 31, 2018

(54) METHOD AND APPARATUS FOR AUTOMATICALLY SWITCHING AN INTELLIGENT DEVICE BETWEEN TEST MODE AND NORMAL WORK MODE

(71) Applicant: Xiaomi Inc., Beijing (CN)

(72) Inventors: Enxing Hou, Beijing (CN); Yanlu Zhang, Beijing (CN); Guangyi Han, Beijing (CN)

(73) Assignee: Xiaomi Inc., Beijing (CN)

( * ) Notice: Subject to any disclaimer, the term of this patent is extended or adjusted under 35 U.S.C. 154(b) by 317 days.

(21) Appl. No.: 15/010,663

(22) Filed: Jan. 29, 2016

(65) Prior Publication Data

US 2017/0034724 A1    Feb. 2, 2017

(30) Foreign Application Priority Data

Jul. 31, 2015 (CN) .......................... 2015 1 0463640

(51) Int. Cl.
| | |
|---|---|
| *H04W 24/08* | (2009.01) |
| *G06F 11/27* | (2006.01) |
| *H04L 12/26* | (2006.01) |
| *H04W 24/00* | (2009.01) |
| *H04W 84/12* | (2009.01) |

(52) U.S. Cl.
CPC ............. *H04W 24/08* (2013.01); *G06F 11/27* (2013.01); *H04L 43/50* (2013.01); *H04W 24/00* (2013.01); *H04W 84/12* (2013.01)

(58) Field of Classification Search
CPC .......... H04W 24/08; H04L 43/50; G06F 11/27
See application file for complete search history.

(56) References Cited

U.S. PATENT DOCUMENTS

| | | | |
|---|---|---|---|
| 6,687,499 B1 | 2/2004 | Numminen et al. | |
| 2006/0006881 A1* | 1/2006 | Hernandez | ......... G01R 29/0835 324/627 |
| 2012/0155308 A1 | 6/2012 | Lee et al. | |
| 2014/0335794 A1 | 11/2014 | Forouzan | |

FOREIGN PATENT DOCUMENTS

| | | | | |
|---|---|---|---|---|
| CN | 102413489 A | * | 4/2012 | ............ H04W 24/00 |
| CN | 102799511 A | | 11/2012 | |
| CN | 103916982 A | | 7/2014 | |
| CN | 104410986 A | | 3/2015 | |
| KR | 10 2004 0090769 A | | 10/2004 | |

(Continued)

OTHER PUBLICATIONS

Yuanqing, machine translation of CN 102413489 A, Apr. 11, 2012 (machine translation obtained on Feb. 6, 2018), 12 pages. (Year: 2012).*

(Continued)

*Primary Examiner* — Hoon J Chung
(74) *Attorney, Agent, or Firm* — Brinks, Gilson & Lione (57) ABSTRACT

The present disclosure provides a method and as apparatus for operating an intelligent device in a test mode. The method includes: scanning a Wi-Fi network periodically, determining whether a service set identifier (SSID) of the Wi-Fi network scanned includes a preset SSID, and operating the intelligent device in a test mode if the SSID of the Wi-Fi network scanned includes the preset SSID.

13 Claims, 7 Drawing Sheets

(56) References Cited

FOREIGN PATENT DOCUMENTS

RU            2 316 148 C2      1/2008
WO    WO 2015/079114 A1    6/2015

OTHER PUBLICATIONS

Simpson, Philips Hue 'connected' light bulb—PCWorld, May 27, 2013, 10 pages.*
Chapre, Yogita et al., "Received Signal Strength Indicator and Its Analysis in a Typical WLAN System (Short Paper)," 38$^{th}$ Annual IEEE Conference on Local Computer Networks, 2013, pp. 304-307.
Extended European Search Report dated Dec. 9, 2016 for European Application No. 16159417.1, 5 pages.
International Search Report and Written Opinion dated Apr. 18, 2016 for International Application No. PCT/CN2015/090592, 13 pages.
Office Action dated Nov. 17, 2016 for Korean Application No. 10-2016-7000969, 7 pages.
Office Action dated Mar. 14, 2017 for Russian Application No. 2016102040/07, 14 pages.

\* cited by examiner

METHOD AND APPARATUS FOR AUTOMATICALLY SWITCHING AN INTELLIGENT DEVICE BETWEEN TEST MODE AND NORMAL WORK MODE

CROSS-REFERENCE TO RELATED APPLICATIONS

This application is based on and claims priority to Chinese Patent Application No. 201510463640.0, filed on Jul. 31, 2015, the entire contents of which are incorporated herein by reference.

FIELD

The present disclosure relates to a field of communication technology, and more particularly, to a method and an apparatus for testing an intelligent device.

BACKGROUND

An intelligent device needs to pass a series of tests before delivery, in order to guarantee the quality of the device. The task implemented by the intelligent device in a test mode is different from that in a normal work mode. Thus, the intelligent device has to enter the test mode in order to conduct proper tests.

SUMMARY

Embodiments of the present disclosure provide a method for testing an intelligent device, and an apparatus for testing an intelligent device.

According to a first aspect of embodiments of the present disclosure, there is provided a method for testing an intelligent device. The method includes: scanning a Wi-Fi network periodically, determining whether a service set identifier (SSID) of the Wi-Fi network scanned includes a preset SSID, and operating the intelligent device in a test mode if the SSID of the Wi-Fi network scanned includes the preset SSID.

According to a second aspect of embodiments of the present disclosure, there is provided an apparatus for testing an intelligent device. The apparatus includes: a scanning module configured to scan a Wi-Fi network periodically, a determining module configured to determine whether a SSID of the Wi-Fi network scanned includes a preset SSID, and an entering module configured to enter a test mode if the SSID of the Wi-Fi network scanned includes the preset SSID.

According to a third aspect of embodiments of the present disclosure, there is provided an apparatus for testing an intelligent device. The apparatus includes: a processor, a memory configured to store an instruction executable by the processor. The processor is configured to scan a Wi-Fi network periodically, determine whether a SSID of the Wi-Fi network scanned includes a preset SSID, and enter a test mode if the SSID of the Wi-Fi network scanned includes the preset SSID.

It is to be understood that both the foregoing general description and the following detailed description are exemplary and explanatory only and are not restrictive of the disclosure.

DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that terms such as "first," "second," and "third" are used herein for describing various information, but the information should not be limited by these terms. The terms are only used for distinguishing the information of the same type from each other. For example, first information may also be called second information, and similarly, the second information may also be called the first information, without departing from the scope of the present disclosure. As used herein, the term "if" may be construed to mean "when" or "upon" or "in response to determining," depending on the context.

An intelligent device usually needs to enter a test mode when being tested. For example, a trigger button may be disposed for the intelligent device to trigger it entering the test mode. A tester may trigger the trigger button manually to control the intelligent device to enter the test mode, and when the intelligent device detects the event of triggering from the trigger button in the background, the device switches to the test mode automatically.

However, in the above solution, some intelligent devices without any trigger button, for example an intelligent bulb, cannot enter the test mode.

Considering the above problem, the present disclosure provides a method for testing an intelligent device. By the steps of scanning a Wi-Fi network periodically, determining whether a service set identifier (SSID) of the Wi-Fi network scanned includes a preset SSID, and entering a test mode if the SSID of the Wi-Fi network scanned includes the preset SSID, the intelligent device is triggered by the SSID of the Wi-Fi network scanned to enter the test mode, such that the intelligent device without any trigger button may enter the test mode normally.

Figure 1:
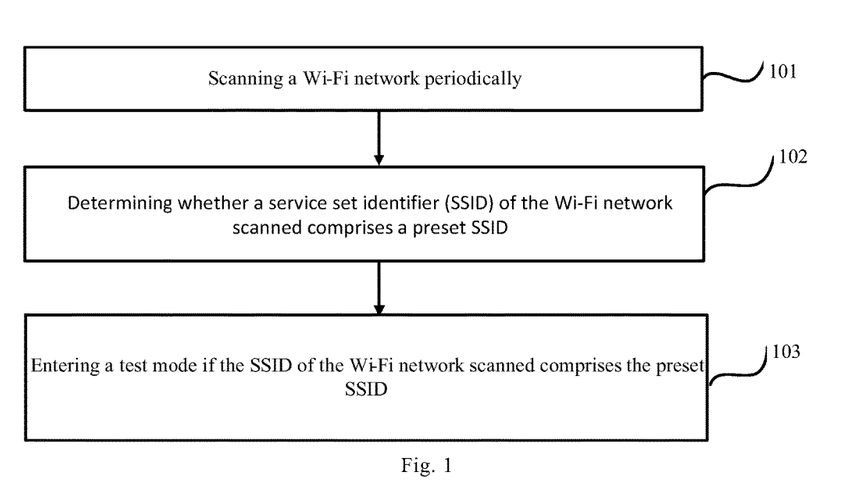
FIG. 1 is a flow chart of a method for testing an intelligent device according to an exemplary embodiment.

FIG. 1 is a flow chart of a method for testing an intelligent device according to an exemplary embodiment, including the following steps.

In step 101, a Wi-Fi network is scanned periodically.

In step 102, it is determined whether a SSID of the Wi-Fi network scanned includes a preset SSID.

In step 103, the device enters a test mode if the SSID of the Wi-Fi network scanned includes the preset SSID.

The technical solution of steps 101-103 may be understood as determination logic loaded in a microcontroller unit (MCU) of the intelligent device.

The intelligent device may include an intelligent device without any trigger button, for example, an intelligent bulb. The intelligent device may include a built-in Wi-Fi module by which the Wi-Fi network is scanned.

In this embodiment, the determination about whether to enter the test mode can be implemented by the determining logic loaded in the MCU of the intelligent device, instead of detection of the triggering event of the trigger button.

The MCU may scan the Wi-Fi network periodically via the built-in Wi-Fi module after being loaded with the determining logic. After the scanning is completed, the MCU may determine whether the intelligent device enters the test mode based on the SSID of the Wi-Fi network scanned, which may be realized by determining whether the SSID of the Wi-Fi network scanned includes a preset SSID.

During the test on the intelligent device, the tester may provide a test-specific Wi-Fi network in a test environment. The SSID of the test-specific Wi-Fi network is the preset SSID which may be fired in a memory of the MCU before the intelligent device leaves the factory. The preset SSID may be a dedicated special character, to avoid conflict with other SSIDs set by the user.

After the first time of power on, the intelligent device may scan the Wi-Fi network via the built-in Wi-Fi module, and determine whether the SSID of the Wi-Fi network scanned includes the preset SSID via the MCU. The intelligent device is regarded in a test environment if the SSID of the Wi-Fi network scanned includes the preset SSID. Then, the MCU is triggered to run a test code preloaded in the memory for running in the test mode, such that the intelligent device enters the test mode.

If it is determined by the MCU that the SSID of the Wi-Fi network scanned does not include the preset SSID, the intelligent device is regarded in a non-test environment. Then, the MCU is triggered to run a universal code preloaded in the memory for running in a normal work mode, such that the intelligent device enters the normal work mode.

In this embodiment, there might be a problem of misjudgment in a practical test scene, in which the intelligent device is regarded in the test environment if the MCU determines that the SSID of the Wi-Fi network scanned includes the preset SSID.

For example, when tested in a practical application, the intelligent device is usually placed in a shielding box or shielding room to provide the intelligent device with a non-interfering test environment. Regarding the test scene in which the intelligent device is placed in the shielding box or shielding room, it is possible that the intelligent device is not placed in the shielding box or shielding room when the MCU determines that the SSID of the Wi-Fi network scanned includes the preset SSID. In such a scene, the MCU directly determines that the intelligent device enters the test mode when the MCU determines that the SSID of the Wi-Fi network scanned includes the preset SSID, which may cause misjudgment.

As for the above test scene, the tester may place a router for the test-specific Wi-Fi network in the shielding box or shielding room when testing the intelligent device. When the MCU determines that the SSID of the Wi-Fi network scanned includes the preset SSID, the MCU may further determine whether the intelligent device is placed in the shielding box or shielding room.

The step of determining by the MCU whether the intelligent device is placed in the shielding box or shielding room may be realized by further determination in step 102 in the determining logic loaded in the MCU.

In an implementation shown in the embodiment, the further judgment may include: further determining by the MCU whether the preset SSID is the only SSID scanned after it is determined by the MCU that the SSID of the Wi-Fi network scanned includes the preset SSID. Since the wireless signal outside the shielding box or shielding room may be shielded after the intelligent device is placed in the shielding box or shielding room, the intelligent device will scan the Wi-Fi signal emitted from the router placed in the shielding box or shielding room via the built-in Wi-Fi module. Thus, when the MCU determines that the preset SSID is the only SSID scanned, it may be determined that the intelligent device is placed in the shielding box or shielding room, and the MCU determines that the intelligent device is going to enter the test mode, and directly runs the test code preloaded in the memory for running in the test mode, such that the intelligent device enters the test mode.

If the MCU determines that the preset SSID is not the only SSID scanned, that is, the intelligent device scans other Wi-Fi networks by the built-in Wi-Fi module, it can be determined that the intelligent device is not placed in the shielding box or shielding room. The MCU determines that the intelligent device is going to enter the normal work mode, and directly runs the universal code preloaded in the memory for running in the normal work mode, such that the intelligent device enters the normal work mode.

In an implementation shown in the embodiment, the further determination may include: further determining by the MCU whether the received signal strength of the Wi-Fi network corresponding to the preset SSID is greater than a preset threshold after it is determined by the MCU that the SSID of the Wi-Fi network scanned includes the preset SSID. Since the strength of the Wi-Fi signal received by the built-in Wi-Fi module of the intelligent device may represent the distance between the intelligent device and the router of the Wi-Fi network, the stronger the strength of the Wi-Fi signal received is, the closer the distance towards the router of the Wi-Fi network is. Consequently, the tester may set a signal strength threshold based on the practical size of the shielding box or shielding room. For example, the minimum signal strength able to be received by the intelligent device in the shielding box or shielding room is taken as the signal strength threshold. Hence, when the MCU determines that the received signal strength of the Wi-Fi network corresponding to the preset SSID is greater than the signal strength threshold, the distance between the intelligent device and the router of the Wi-Fi network is less than the practical size of the shielding box or shielding room. That is, the intelligent device is placed in the interior of the shielding box or shielding room, and then it can be determined that the intelligent device has been placed within the shielding box or shielding room, such that the MCU determines that the intelligent device is going to enter the test mode, and directly runs the test code preloaded in the memory for running in the test mode, so as to make the intelligent device enter the test mode.

When the MCU determines that the received signal strength of the Wi-Fi network corresponding to the preset SSID is less than the signal strength threshold, the distance between the intelligent device and the router of the Wi-Fi network is greater than the practical size of the shielding box or shielding room. That is, the intelligent device is placed outside the shielding box or shielding room, and then it can be determined that the intelligent device is not placed within the shielding box or shielding room, such that the MCU determines that the intelligent device is going to enter the normal work mode, and directly runs the universal code preloaded in the memory for running in the normal work mode, so as to make the intelligent device enter the normal work mode.

Consequently, the above implementation may avoid misjudgment in the practical test scene when the MCU determines whether the SSID of the Wi-Fi network scanned includes the preset SSID so as to make the intelligent device enter the test mode.

In the above embodiment, by the steps of scanning the Wi-Fi network periodically, determining whether the SSID of the Wi-Fi network scanned includes the preset SSID, and entering the test mode if the SSID of the Wi-Fi network scanned includes the preset SSID, the intelligent device is triggered by the SSID of the Wi-Fi network scanned to enter the test mode, such that the intelligent device without any trigger button may enter the test mode normally.

Figure 2:
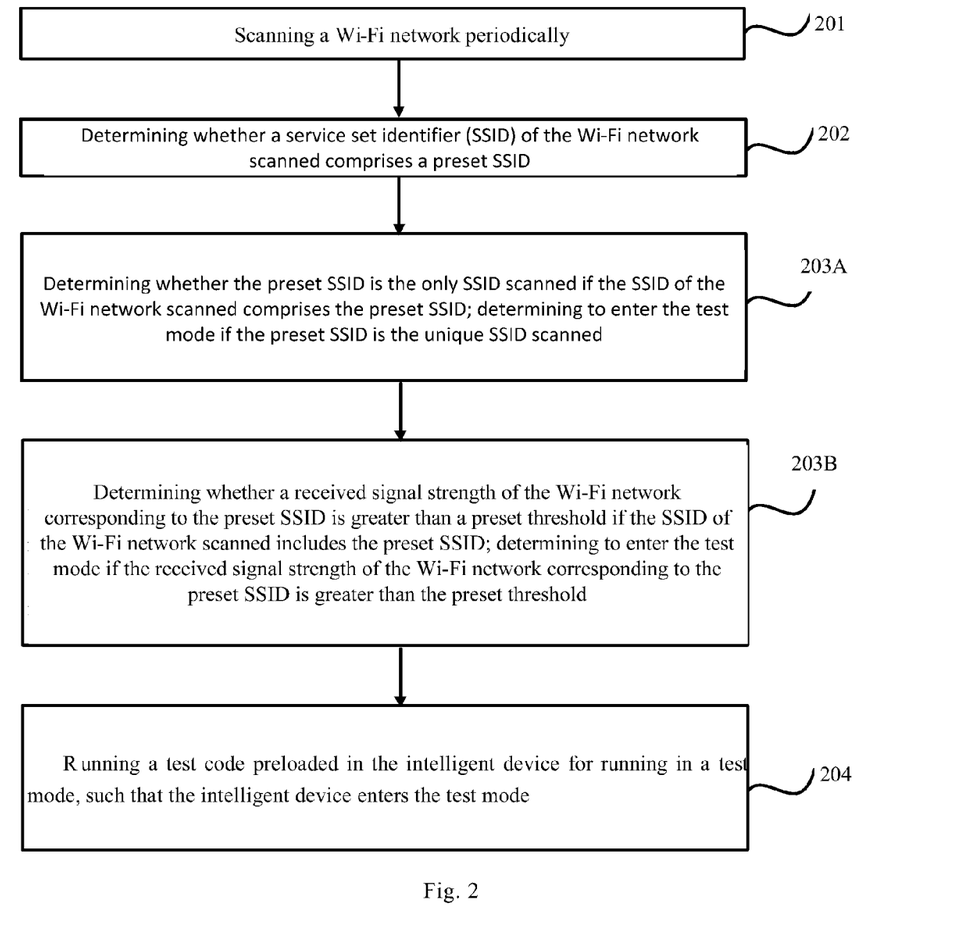
FIG. 2 is a flow chart of another method for testing an intelligent device according to an exemplary embodiment.

FIG. 2 is a flow chart of another method for testing an intelligent device according to an exemplary embodiment, including the following steps.

In step 201, a Wi-Fi network is scanned periodically.

In step 202, it is determined whether a SSID of the Wi-Fi network scanned includes a preset SSID.

In step 203-A, it is determined whether the preset SSID is the only SSID if the SSID of the Wi-Fi network scanned includes the preset SSID. It is determined to enter the test mode if the preset SSID is the only SSID.

In step 203-B, it is determined whether a received signal strength of the Wi-Fi network corresponding to the preset SSID is greater than a preset threshold if the SSID of the Wi-Fi network scanned includes the preset SSID. It is determined to enter the test mode if the received signal strength of the Wi-Fi network corresponding to the preset SSID is greater than the preset threshold.

The step 203-A and the step 203-B are parallel steps.

In step 204, a test code preloaded in the intelligent device for running in a test mode is run when it is determined to enter the test mode, such that the intelligent device enters the test mode.

The technical solution of steps 201-204 may be understood as determining logic loaded in the MCU of the intelligent device.

The intelligent device may include an intelligent device without any trigger button, for example, an intelligent bulb.

The intelligent device may include a built-in Wi-Fi module by which the Wi-Fi network is scanned.

In this embodiment, the judgment about whether to enter the test mode can be implemented by the determining logic loaded in the MCU of the intelligent device, instead of detection of the triggering event of the trigger button.

The MCU may scan the Wi-Fi network periodically via the built-in Wi-Fi module after being loaded with the judgment logic. After the scanning is completed, the MCU may determine whether the intelligent device enters the test mode based on the SSID of the Wi-Fi network scanned, which may be realized by determining whether the SSID of the Wi-Fi network scanned includes a preset SSID.

During the test on the intelligent device, the tester may provide a test-specific Wi-Fi network in a test environment. The SSID of the test-specific Wi-Fi network is the preset SSID which may be fired in a memory of the MCU before the intelligent device leaves the factory. The preset SSID may be a dedicated special character, to avoid conflict with other SSIDs set by the user.

After the first time of power on, the intelligent device may scan the Wi-Fi network via the built-in Wi-Fi module, and determines whether the SSID of the Wi-Fi network scanned includes the preset SSID via the MCU. The intelligent device is regarded in a test environment if the SSID of the Wi-Fi network scanned includes the preset SSID. Then, the MCU is triggered to run a test code preloaded in the memory for running in the test mode, such that the intelligent device enters the test mode.

If it is determined by the MCU that the SSID of the Wi-Fi network scanned does not include the preset SSID, the intelligent device is regarded in a non-test environment. Then, the MCU is triggered to run a universal code preloaded in the memory for running in a normal work mode, such that the intelligent device enters the normal work mode.

In this embodiment, there might be a problem of misjudgment in a practical test scene, in which the intelligent device is regarded in the test environment if the MCU determines that the SSID of the Wi-Fi network scanned includes the preset SSID.

For example, when tested in a practical application, the intelligent device is usually placed in a shielding box or shielding room to provide the intelligent device with a non-interfering test environment. Regarding the test scene in which the intelligent device is placed in the shielding box or shielding room, it is possible that the intelligent device is not placed in the shielding box or shielding room when the MCU determines that the SSID of the Wi-Fi network scanned includes the preset SSID. In such a scene, the MCU directly determines that the intelligent device enters the test mode when the MCU determines that the SSID of the Wi-Fi network scanned includes the preset SSID, which may cause misjudgment.

As for the above test scene, the tester may place a router for the test-specific Wi-Fi network in the shielding box or shielding room when testing the intelligent device. When the MCU determines that the SSID of the Wi-Fi network scanned includes the preset SSID, the MCU may further determines whether the intelligent device is placed in the shielding box or shielding room.

In an implementation shown in the embodiment, the further judgment may include: further determining by the MCU whether the preset SSID is a unique SSID scanned after it is determined by the MCU that the SSID of the Wi-Fi network scanned includes the preset SSID. Since the wireless signal outside the shielding box or shielding room may be shielded after the intelligent device is placed in the shielding box or shielding room, the intelligent device will scan the Wi-Fi signal emitted from the router placed in the shielding box or shielding room via the built-in Wi-Fi module. Thus, when the MCU determines that the preset SSID is the only SSID scanned, it may be determined that the intelligent device is placed in the shielding box or shielding room, and the MCU determines that the intelligent device is going to enter the test mode, and directly runs the test code preloaded in the memory for running in the test mode, such that the intelligent device enters the test mode.

If the MCU determines that the preset SSID is not the only SSID scanned, that is, the intelligent device scans other Wi-Fi networks by the built-in Wi-Fi module, it can be determined that the intelligent device is not placed in the shielding box or shielding room. The MCU determines that the intelligent device is going to enter the normal work mode, and directly runs the universal code preloaded in the memory for running in the normal work mode, such that the intelligent device enters the normal work mode.

In an implementation shown in the embodiment, the further determination may include: further determining by the MCU whether a received signal strength of the Wi-Fi network corresponding to the preset SSID is greater than a preset threshold after it is determined by the MCU that the SSID of the Wi-Fi network scanned includes the preset SSID. Since the strength of the Wi-Fi signal received by the built-in Wi-Fi module of the intelligent device may represent the distance between the intelligent device and the router of the Wi-Fi network—the stronger the strength of the Wi-Fi signal received is, the closer the distance towards the router of the Wi-Fi network is. Consequently, the tester may set a signal strength threshold based on the practical size of the shielding box or shielding room. For example, the minimum signal strength able to be received by the intelligent device in the shielding box or shielding room is taken as the signal strength threshold. Hence, when the MCU determines that the received signal strength of the Wi-Fi network corresponding to the preset SSID is greater than the signal strength threshold, the distance between the intelligent device and the router of the Wi-Fi network is less than the practical size of the shielding box or shielding room. That is, the intelligent device is placed in the interior of the shielding box or shielding room, and then it can be determined that the intelligent device has been placed within the shielding box or shielding room, such that the MCU determines that the intelligent device is going to enter the test mode, and directly runs the test code preloaded in the memory for running in the test mode, so as to make the intelligent device enter the test mode.

Of course, when the MCU determines that the received signal strength of the Wi-Fi network corresponding to the preset SSID is less than the signal strength threshold, the distance between the intelligent device and the router of the Wi-Fi network is greater than the practical size of the shielding box or shielding room. That is, the intelligent device is placed outside the shielding box or shielding room, and then it can be determined that the intelligent device is not placed within the shielding box or shielding room, such that the MCU determines that the intelligent device is going to enter the normal work mode, and directly runs the universal code preloaded in the memory for running in the normal work mode, so as to make the intelligent device enter the normal work mode.

Consequently, the above implementation may avoid misjudgment in the practical test scene when the MCU judges whether the SSID of the Wi-Fi network scanned includes the preset SSID so as to make the intelligent device enter the test mode.

In the following, the above technical solution will be illustrated with reference to a specific application example.

The intelligent device is supposed to be an intelligent bulb.

The hardware structure of the intelligent bulb may include a MCU module and a Wi-Fi module. The MCU module is loaded with the determining logic shown in the above embodiment, and the intelligent bulb may scan the Wi-Fi network by the Wi-Fi module.

When the intelligent bulb is produced, the tester may place the intelligent bulb in the shielding box or shielding room and power the bulb on for test. The shielding box or shielding room is equipped with a router of the test-specific Wi-Fi network.

After the intelligent bulb is powered on, the bulb scans the Wi-Fi network in the shielding box or shielding room via the built-in Wi-Fi module. The MCU runs the determining logic loaded, to determine whether the SSID of the Wi-Fi network scanned includes the preset SSID. The MCU may further determine whether the intelligent device is placed within the shielding room or shielding box if the SSID of the Wi-Fi network scanned includes the preset SSID.

In an implementation, the MCU may further determine whether the preset SSID is a unique SSID scanned if the SSID of the Wi-Fi network scanned includes the preset SSID. If the preset SSID is the unique SSID scanned, the MCU may determine that the intelligent device is placed in the shielding box or shielding room, and then may be triggered to run the above test code loaded in the memory, such that the intelligent device enters the test mode. If the preset SSID is not the unique SSID scanned, the MCU may determine that the intelligent device is not placed in the shielding box or shielding room, then may be triggered to run the universal code loaded in the memory, such that the intelligent device enters the normal work mode.

In another implementation, the MCU may further determine whether the received signal strength of the Wi-Fi network corresponding to the preset SSID is greater than the preset threshold if the SSID of the Wi-Fi network scanned includes the preset SSID. If the received signal strength of the Wi-Fi network corresponding to the preset SSID is greater than the preset threshold, the MCU may determine that the intelligent device is placed in the shielding box or shielding room, and then may be triggered to run the above test code loaded in the memory, such that the intelligent device enters the test mode. If the received signal strength of the Wi-Fi network corresponding to the preset SSID is smaller than the preset threshold, the MCU may determine that the intelligent device is not placed in the shielding box or shielding room, then may be triggered to run the universal code loaded in the memory, such that the intelligent device enters the normal work mode.

In the above embodiment, by the steps of scanning the Wi-Fi network periodically, determining whether the SSID of the Wi-Fi network scanned includes the preset SSID, and entering the test mode if the SSID of the Wi-Fi network scanned includes the preset SSID, the intelligent device is triggered by the SSID of the Wi-Fi network scanned to enter the test mode, such that the intelligent device without any trigger button may enter the test mode normally.

The present disclosure further provides an embodiment of an apparatus corresponding to the embodiment of the method for testing the intelligent device.

Figure 3:
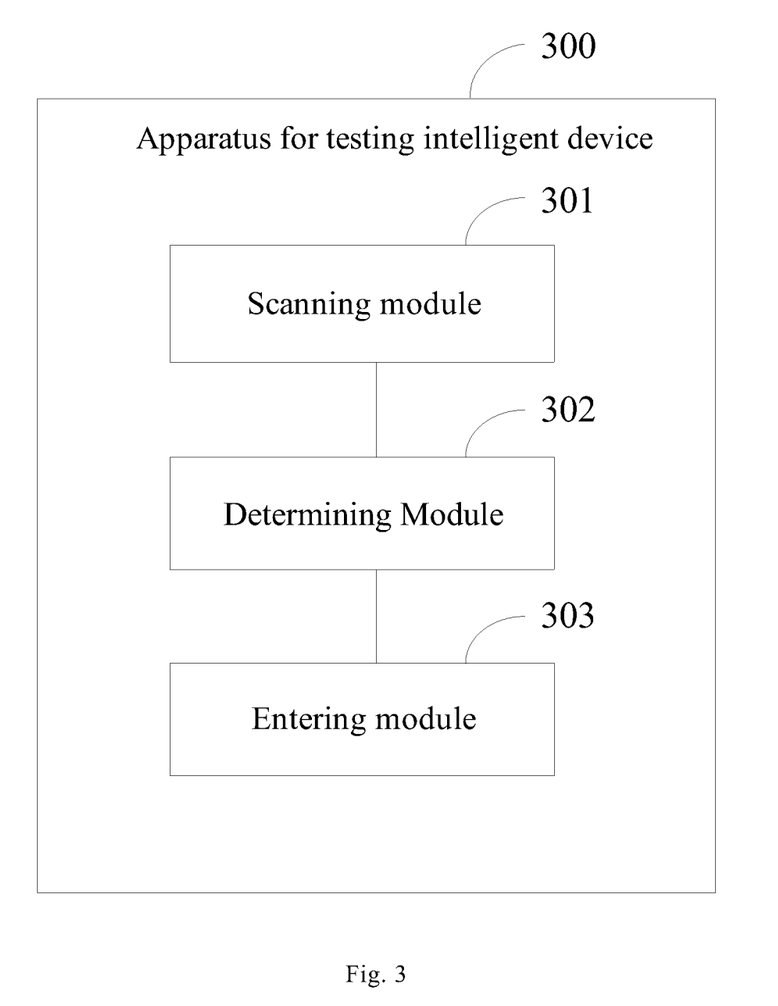
FIG. 3 is a schematic diagram of an apparatus for testing an intelligent device according to an exemplary embodiment.

FIG. 3 is a schematic diagram of an apparatus for testing an intelligent device according to an exemplary embodiment.

As shown in FIG. 3, an apparatus 300 for testing an intelligent device according to an exemplary embodiment includes a scanning module 301, a determining module 302 and an entering module 303. The scanning module 301 is configured to scan a Wi-Fi network periodically. The determining module 302 is configured to determine whether the SSID of the Wi-Fi network scanned includes a preset SSID. The entering module 303 is configured to enter a test mode if the SSID of the Wi-Fi network scanned includes the preset SSID.

In the above embodiment, by scanning the Wi-Fi network periodically, determining whether the SSID of the Wi-Fi network scanned includes the preset SSID, and entering the test mode if the SSID of the Wi-Fi network scanned includes the preset SSID, the intelligent device is triggered by the SSID of the Wi-Fi network scanned to enter the test mode, such that the intelligent device without any trigger button may enter the test mode normally.

Figure 4:
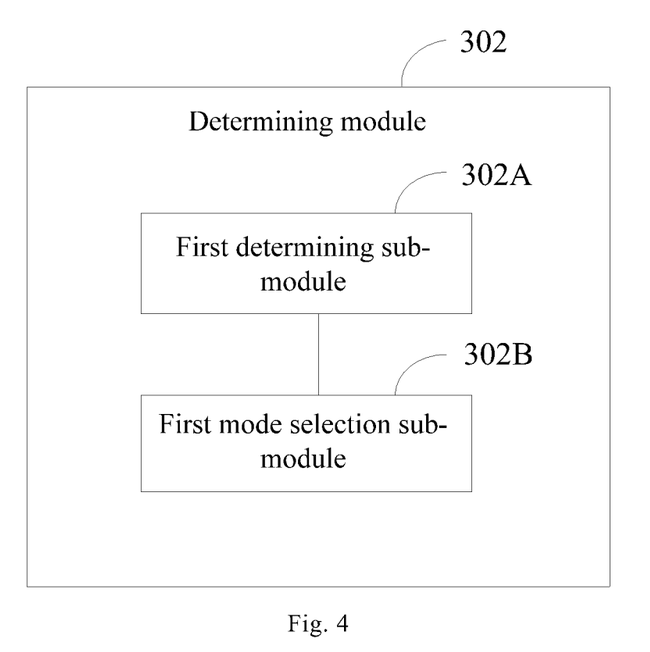
FIG. 4 is a schematic diagram of another apparatus for testing an intelligent device according to an exemplary embodiment.

FIG. 4 is a schematic diagram of another apparatus for testing an intelligent device according to an exemplary embodiment. This embodiment is based on the embodiment shown in FIG. 3. The determining module 302 may include a first determining sub-module 302A and a first mode selection sub-module 302B. The first determining sub-module 302A is configured to determine whether the preset SSID is the only SSID scanned if the SSID of the Wi-Fi network scanned includes the preset SSID. The first mode selecting sub-module 302B is configured to determine to enter the test mode if the preset SSID is the only SSID scanned.

Figure 5:
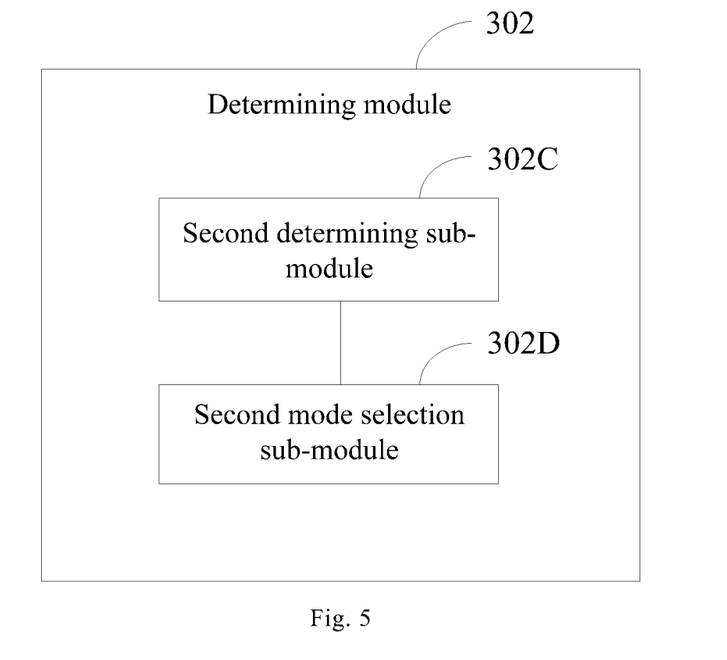
FIG. 5 is a schematic diagram of another apparatus for testing an intelligent device according to an exemplary embodiment.

FIG. 5 is a schematic diagram of another apparatus for testing an intelligent device according to an exemplary embodiment. This embodiment is based on the embodiment shown in FIG. 3. The determining module 302 may include a second determining sub-module 302C and a second mode selecting sub-module 302D. The second determining sub-module 302C is configured to determine whether a received signal strength of the Wi-Fi network corresponding to the preset SSID is greater than a preset threshold if the SSID of the Wi-Fi network scanned includes the preset SSID. The second mode selecting sub-module 302D is configured to determine to enter the test mode if the received signal strength of the Wi-Fi network corresponding to the preset SSID is greater than the preset threshold.

It shall be noted that the structures of the second determining sub-module 302C and the second mode selecting sub-module 302D shown in the apparatus embodiment of FIG. 5 may be contained in the apparatus embodiment of FIG. 4, which is not limited in the present disclosure.

Figure 6:
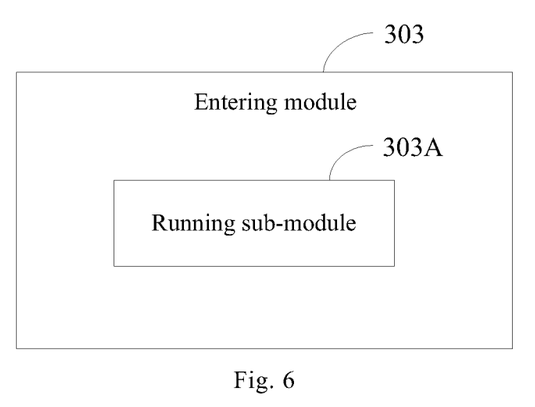
FIG. 6 is a schematic diagram of another apparatus for testing an intelligent device according to an exemplary embodiment.

FIG. 6 is a schematic diagram of another apparatus for testing an intelligent device according to an exemplary embodiment. This embodiment is based on the embodiment shown in FIG. 3. The entering module 303 may include a running sub-module 303A which is configured to run a test code preloaded in the intelligent device for running in a test mode, such that the intelligent device enters the test mode.

It shall be noted that the structure of the running sub-module 303A shown in the apparatus embodiment of FIG. 6 may be contained in the apparatus embodiments of FIG. 4 and FIG. 5, which is not limited in the present disclosure.

With respect to the devices in the above embodiments, the specific manners for performing operations for individual modules therein have been described in detail in the embodiments regarding the methods, which will not be elaborated herein.

The apparatus embodiment is substantially corresponding to the method embodiment, so relevant part of illustration of the method embodiment may be referred to apparatus embodiment described above is only exemplary, in which the modules described as separate components may be or may not be physically separate; the component shown as the module may be or not be a physical module, i.e. may be located at a position or be distributed at many network modules. It is possible to select part of or all of the modules to realize the objective of the present disclosure, which may be understood and implemented by those skilled in the art without paying more creative effort.

Accordingly, the present disclosure further provides an apparatus for testing an intelligent device. The apparatus includes a processor and a memory configured to store an instruction executable by the processor, in which the processor is configured to scan a Wi-Fi network periodically, to determine whether a SSID of the Wi-Fi network scanned includes a preset SSID, and to enter a test mode if the SSID of the Wi-Fi network scanned includes the preset SSID.

Accordingly, the present disclosure further provides an intelligent device. The intelligent device includes a memory and one or more programs which are stored in the memory. One or more of the processors are configured to execute the instructions for the following operations contained in the one or more programs: scanning a Wi-Fi network periodically, determining whether the SSID of the Wi-Fi network scanned includes a preset SSID, and entering a test mode if the SSID of the Wi-Fi network scanned includes the preset SSID.

Figure 7:
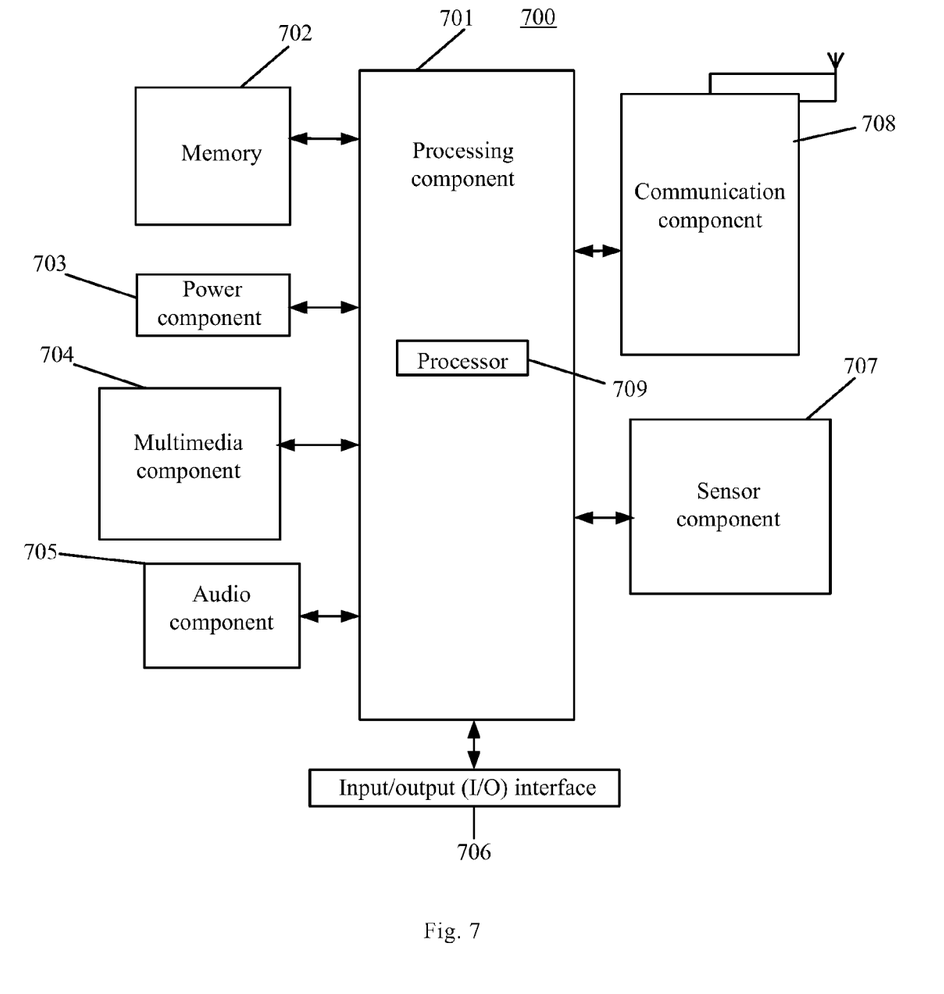
FIG. 7 is a schematic diagram of an apparatus for testing the intelligent device according to an exemplary embodiment.

FIG. 7 is a schematic diagram of an apparatus 700 for testing the intelligent device according to an exemplary embodiment. The apparatus 700 may be an intelligent device, a mobile phone, a computer, a digital broadcast terminal, a messaging device, a gaming console, a tablet, a medical device, exercise equipment, a personal digital assistant and the like.

Referring to FIG. 7, the apparatus 700 may include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the apparatus 700, such as the operations associated with display, telephone calls, data communications, camera operations, and recording operations. The processing component 701 may include one or more processors 709 to execute instructions to perform all or part of the steps in the above described methods. Moreover, the processing component 701 may include one or more modules which facilitate the interaction between the processing component 701 and other components. For instance, the processing component 701 may include a multimedia module to facilitate the interaction between the multimedia component 704 and the processing component 701.

The memory 702 is configured to store various types of data to support the operation of the apparatus 700. Examples of such data include instructions for any applications or methods operated on the apparatus 700, contact data, phonebook data, messages, pictures, video, etc. The memory 702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 provides power to various components of the apparatus 700. The power component 703 may include a power management system, one or more power sources, and any other components associated with the generation, management, and distribution of power in the apparatus 700.

The multimedia component 704 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 704 includes a front camera and/or a rear camera. The front camera and/or the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 705 is configured to output and/or input audio signals. For example, the audio component 705 includes a microphone ("MIC") configured to receive an external audio signal when the apparatus 700 is in an operation mode, such as a call mode, a recording mode, and a voice recognition mode. The received audio signal may be further stored in the memory 702 or transmitted via the communication component 708. In some embodiments, the audio component 705 further includes a speaker to output audio signals.

The I/O interface 702 provides an interface between the processing component 701 and peripheral interface modules, such as a keyboard, a click wheel, buttons, and the like. The buttons may include, but are not limited to, a home button, a volume button, a starting button, and a locking button.

The sensor component 707 includes one or more sensors to provide status assessments of various aspects of the apparatus 700. For instance, the sensor component 707 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 707 may include a proximity sensor configured to detect the presence of nearby objects without any physical contact. The sensor component 707 may also include a light sensor, such as a CMOS or CCD image sensor, for use in imaging applications. In some embodiments, the sensor component 707 may also include an accelerometer sensor, a gyroscope sensor, a magnetic sensor, a pressure sensor, or a temperature sensor.

The communication component 708 is configured to facilitate communication, wired or wirelessly, between the apparatus 700 and other devices. The apparatus 700 can access a wireless network based on a communication standard, such as Wi-Fi, 2G, or 3G, or a combination thereof. In one exemplary embodiment, the communication component 708 receives a broadcast signal or broadcast associated information from an external broadcast management system via a broadcast channel. In one exemplary embodiment, the communication component 708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 702, executable by the processor 709 in the apparatus 700, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor of the mobile terminal, the mobile terminal is able to execute a method for testing an intelligent device, including: scanning a Wi-Fi network periodically, judging whether the SSID of the Wi-Fi network scanned includes a preset SSID, and entering a test mode if the SSID of the Wi-Fi network scanned includes the preset SSID.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for automatically switching an intelligent device between a test mode and a normal work mode, comprising:
scanning, by the intelligent device, a Wi-Fi network periodically;
determining, by the intelligent device, that a service set identifier (SSID) of the Wi-Fi network scanned comprises a preset SSID;
determining, by the intelligent device, whether a received signal strength of the Wi-Fi network corresponding to the preset SSID is greater than a preset threshold;
triggering the intelligent device to enter the test mode if the received signal strength of the Wi-Fi network corresponding to the preset SSID is higher than the preset threshold; and triggering the intelligent device to enter the normal work mode if the received signal strength is lower than the preset threshold.

2. The method according to claim 1, further comprising:
determining whether the preset SSID is the only SSID scanned;
triggering the intelligent device to enter the test mode if the preset SSID is the only SSID scanned; and
triggering the intelligent device to enter the normal work mode if the preset SSID is not the only SSID scanned.

3. The method according to claim 1, wherein the preset threshold is determined based on a size of a shielding space where the intelligent device is tested.

4. The method according to claim 1, wherein triggering the intelligent device to enter the test mode comprises:
running a test code preloaded in the intelligent device for running in the test mode, such that the intelligent device enters the test mode.

5. The method according to claim 1, wherein the preset SSID comprises a dedicated special character.

6. The method according to claim 5, wherein the preset SSID is stored in a memory of a microcontroller unit (MCU) in the intelligent device.

7. An intelligent device configured to automatically switch between a test mode and a normal work mode, comprising:
a processor;
a memory configured to store an instruction executable by the processor,
wherein the processor is configured to:
scan a Wi-Fi network periodically;
determine that an identifier of the Wi-Fi network scanned comprises a preset identifier;
determine whether a received signal strength of the Wi-Fi network corresponding to the preset identifier is greater than a preset threshold;
trigger the intelligent device to enter the test mode if the received signal strength of the Wi-Fi network corresponding to the preset identifier is higher than the preset threshold; and
trigger the intelligent device to enter the normal work mode if the received signal strength is lower than the preset threshold.

8. The intelligent device according to claim 7, wherein the processor is further configured to:
determine whether the preset identifier is the only identifier scanned if the identifier of the Wi-Fi network scanned comprises the preset identifier;
trigger the intelligent device to enter the test mode if the preset identifier is the only identifier scanned; and
trigger the intelligent device to enter the normal work mode if the preset identifier is not the only identifier scanned.

9. The intelligent device according to claim 7, wherein the preset threshold is determined based on a size of a shielding space where the intelligent device is tested.

10. The intelligent device according to claim 7, wherein the processor is further configured to run a test code preloaded in the intelligent device for running in the test mode, such that the intelligent device enters the test mode.

11. The intelligent device according to claim 7, is an intelligent bulb.

12. The intelligent device according to claim 7, wherein the identifier of the Wi-Fi network comprises a service set identifier (SSID).

13. A non-transitory computer-readable storage medium having stored therein instructions that, when executed by a processor of a terminal device, causes the terminal device to perform a method for automatically switching the terminal device between a test mode and a normal work mode, the method comprising:
scanning a Wi-Fi network periodically;
determining that a service set identifier (SSID) of the Wi-Fi network scanned comprises a preset SSID; and
determining, by the terminal device, whether a received signal strength of the Wi-Fi network corresponding to the preset SSID is greater than a preset threshold;
triggering the terminal device to enter the test mode if the received signal strength of the Wi-Fi network corresponding to the preset SSID is higher than the preset threshold; and
triggering the terminal device to enter the normal work mode if the received signal strength is lower than the preset threshold.

* * * * *